Figure 1:
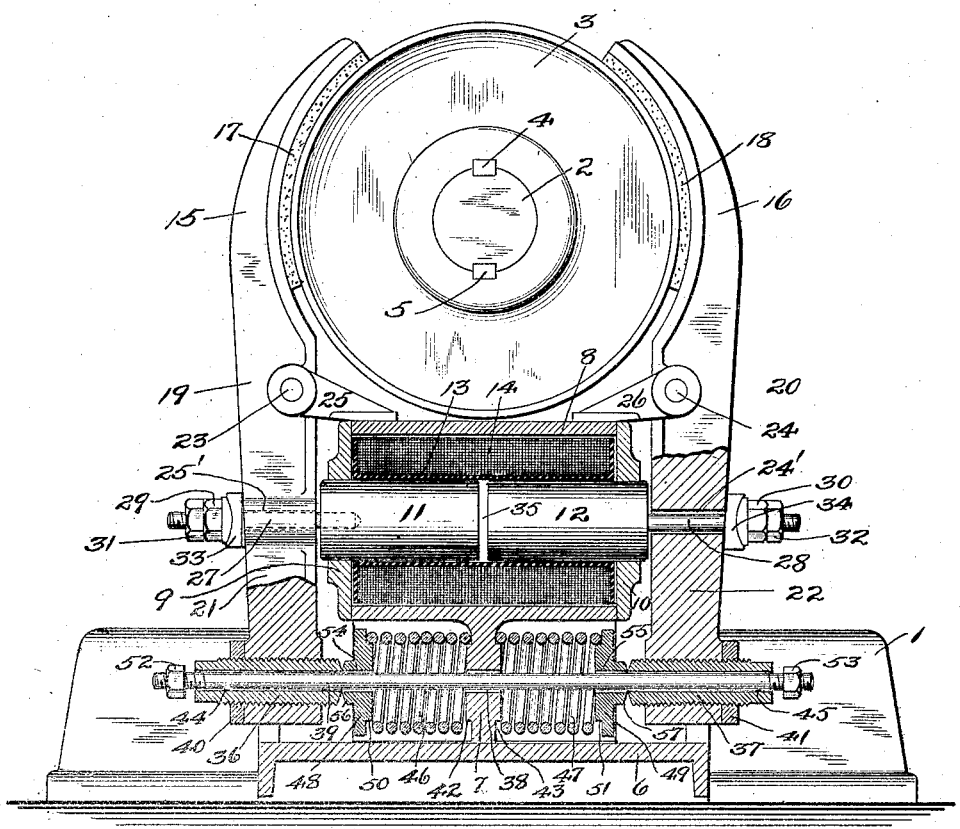

J. D. IHLDER.
DOUBLE BRAKE.
APPLICATION FILED AUG. 24, 1905

1,011,200.

Patented Dec. 12, 1911.

2 SHEETS—SHEET 1.

WITNESSES:
Henry E. Kirby
George H. Dimpsius

INVENTOR
John D. Ihlder
BY
C. M. Nissen
ATTORNEY.

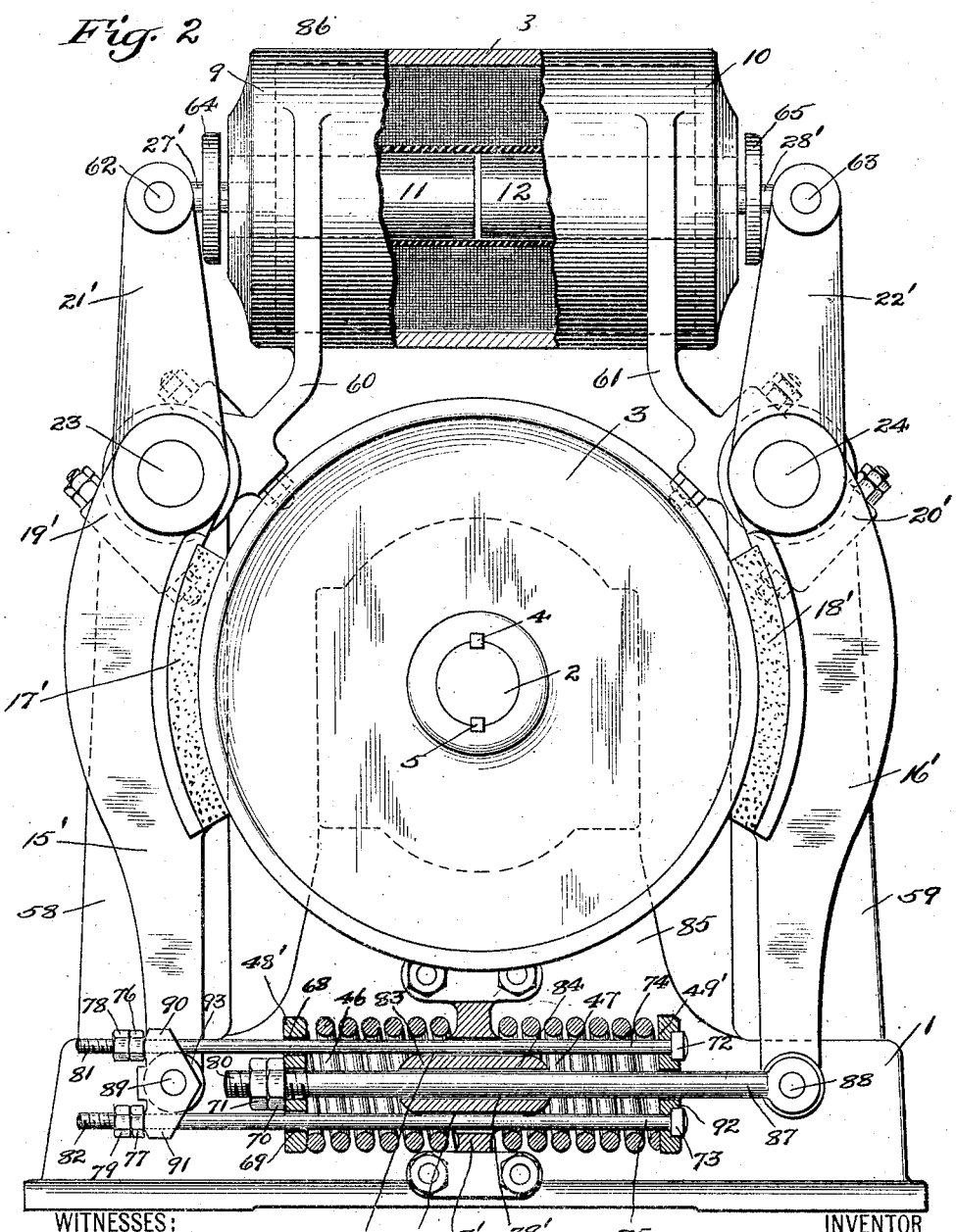

UNITED STATES PATENT OFFICE.

JOHN D. IHLDER, OF NEW YORK, N. Y., ASSIGNOR TO OTIS ELEVATOR COMPANY, OF JERSEY CITY, NEW JERSEY, A CORPORATION OF NEW JERSEY.

DOUBLE BRAKE.

1,011,200.  Specification of Letters Patent.  Patented Dec. 12, 1911.

Application filed August 24, 1905. Serial No. 275,627.

*To all whom it may concern:*

Be it known that I, JOHN D. IHLDER, a citizen of the United States, residing at New York city, in the county of New York and State of New York, have invented a new and useful Improvement in Double Brakes, of which the following is a specification.

My invention relates to brakes, and one of its objects is the provision of independent brake-applying means so arranged that if certain parts should become disabled to prevent one brake shoe from being applied the other shoe would still be effectively applied.

Other objects of the invention will appear hereinafter, the novel combinations of elements being set forth in the claims hereto appended.

Referring to the drawings, Figure 1 represents in elevation, with certain parts in section, one form of my invention; and Fig. 2 represents a modification thereof.

In Fig. 1 the reference number 1 designates the bed-plate of a motor to the shaft 2 of which is secured by means of the keys 4, 5 a friction or brake pulley 3. Fastened rigidly to the bed-plate 1 is a frame 6 to the center of which is secured the standard 7 for supporting the cylindrical frame 8 of the brake magnet. Cap plates 9 and 10 close the ends of the cylinder 8 and are provided with central openings through which are adapted to move the cores 11 and 12. 13 designates a spool of insulating material on which is wound the solenoid 14.

It will be noticed that the cores 11 and 12 make a close fit with the cap plates 9 and 10, respectively, and are actually in contact with the same at all times, but it is to be understood that these cores may move freely in and out of the holes in these cap plates. Preferably the cylinder 8 and cap plates are made of iron or soft steel so that a complete magnetic circuit for the magnet solenoid is obtained with the exception of the small air gap between the inner inclosed ends of the cores 11 and 12. This air gap can be made quite small as it requires only a small movement of the brake arms 15 and 16 to release the brake shoes 17 and 18 from the brake pulley 3.

The brake levers 19 and 20 are pivoted respectively to the brackets 25 and 26 which are rigidly secured to the cylinder 8 of the electromagnet. The upwardly extending arms 15 and 16 of these levers are curved to conform to the periphery of the brake pulley 3, and their inner faces are provided with a material having a high co-efficient of friction so as to constitute efficient brake shoes 17 and 18.

Through perforations 25' and 24' in the downwardly extending arms 21 and 22, respectively, pass the rods 27 and 28 which are rigidly connected to the centers of the outer ends of the cores 11 and 12. The outer ends of the rods 27 and 28 are screw-threaded and provided with adjusting nuts 29 and 30, respectively, and also locking nuts 31 and 32. Between the adjusting nuts 29, 30 and the arms 21, 22 are bearing plates or washers 33, 34, respectively. It is now clear that when the electromagnet is energized the cores 11 and 12 will be drawn inwardly to close the air gap 35 and that the levers 19 and 20 will be rocked about their pivotal points 23 and 24 so that the brake shoes 17 and 18, respectively, will be held out of engagement with the brake pulley 3.

Having described the brake releasing means, I will now describe the brake applying means. Through screw-threaded openings in the extreme lower ends of the arms 21 and 22 are passed the screw-threaded bushings 36 and 37 which are provided with longitudinal holes 44 and 45 for receiving the rod 39. This rod is of smaller diameter than the longitudinal holes so as to allow a certain movement in arc of the arms 21 and 22 of the brake levers 19 and 20. The rod 39 also passes through an enlarged opening 38 in the standard 7.

The standard 7 between the frame 6 and magnet cylinder 8 is provided with circular shoulders 42 and 43 over which fit the inner ends of the helical springs 46 and 47, respectively. The outer ends of the springs 46 and 47 fit over circular shoulders 50 and 51, respectively, of the disks 48 and 49 which are loosely mounted on the rod 39 so as to allow the same to have a longitudinal movement on said rod.

It will be noticed that the rod 39 passes longitudinally through the axes of these springs 46 and 47 and that the latter are entirely independent of each other. In order to prevent the rod 39 from being moved from its proper position, nuts 52, 53 are placed on the screw-threaded ends of this rod. If desired, however, the rod 39 may be screw-threaded at its center and passed through a screw-threaded opening in the center of the standard 7, in which case lock nuts would be placed on each side of the standard 7 so that the vibrations of the apparatus could not unscrew the rod and finally displace it entirely. I prefer, however, the construction shown with the openings 44, 45 and 38 of larger diameter than the rod 39 so as to allow certain up and down movement of the rod 39 bodily. The disks 48 and 49 are also provided with enlarged openings 54 and 55. The springs 46 and 47 are very powerful and therefore maintain the spherical projections 56 and 57 of these disks in frictional engagement with the inner spherical ends of the screw-threaded bushings 36 and 37, and so that the opening 44 shall be in alinement with the opening 54 and the opening 45 in alinement with the opening 55.

When the electromagnet is energized, the lower arms 21 and 22 are drawn inwardly and so also the bushings 36, 37 which transmit pressure through the disks 48 and 49 to the springs 46 and 47, to compress the same. At the same time the brake shoes are released from the brake pulley 3 and consequently the driving shaft 2 can now revolve. In order to stop the motor connected to this shaft the magnet is deënergized whereupon the springs 46 and 47 act to move the arms 21 and 22 outwardly and the arms 15 and 16 inwardly, respectively, to apply the brake shoes 17 and 18. With the exception of the rod 39 which prevents the disks 48 and 49 from being displaced and consequently also the brake-applying springs, the brake levers and connections are entirely independent of each other. In the usual form of brake, a single spring is employed or the springs are so arranged that if one essential part of the brake mechanism is disabled the whole structure becomes inoperative. But with the present construction if one of the springs should break or one of the connections give way, the brake shoe on the opposite side, instead of being rendered inoperative, would be applied to the pulley and could not be released by the electromagnet until the apparatus had been repaired. For example, if the spring 47 should break, the brake lever 22 would be free to swing about its pivot and release the brake shoe 18. The spring 46, however, would remain operative to hold the brake shoe 17 applied, even if the releasing magnet were energized, because the core 12 would then be pulled into contact with the core 11. The core 11 can only be moved inwardly by the pull of the magnet to release the brake 17 when a spring 47 is supplied to resist the inward pull on the core 12. I, therefore, provide a simple and efficient safeguard against the emergency of a motor running away which might happen to an electric motor driving elevator apparatus in which case the car might not be stopped at the limits of travel without damage.

In Fig. 2 I have shown a modified form of construction which will be found convenient when there is insufficient room under the brake pulley for both the electromagnet and the brake-applying springs. Fig. 1 shows the more compact arrangement but it will be noticed that in Fig. 2 the motor shaft 2 is nearer the bed-plate 1, that is, it is lower. In this case the electromagnet is placed above the brake pulley and springs beneath the same. It is obvious that the brake-applying means shown in Fig. 1 could not be used in connection with the brake levers of Fig. 2 as the downwardly extending arms must be moved inwardly to apply the brake shoes.

In Fig. 2 one of the bearings for the motor shaft 2 is designated by the reference number 85 and is shown back of the brake pulley in dotted lines. 58 and 59 are supports which are rigidly connected with the bed plate 1. The brake levers 19′ and 20′ are pivotally supported on bearings at 23 and 24 at the upper ends of the supports 58 and 59, respectively. Adjustably secured to the upper ends of these supports are the inwardly and upwardly extending brackets 60 and 61, which support the electromagnet 86. I have in this instance shown the brackets integral with the cylinder 8 of the electromagnet. The cap plates 9 and 10, cores 11 and 12, and stems 27′ and 28′ are similar to those shown in Fig. 1. I have shown collars 64 and 65, however, secured to the stems 27′ and 28′, respectively, to limit the inward movement of the cores. The stems 27′ and 28′ are pivotally connected at 62 63, respectively, to the upper ends of the arms 21′ and 22′. The standard 7′ is rigidly secured to the bed plate 1 and is provided with laterally extending spherical portions 83 and 84 over which fit the inner ends of the springs 46 and 47, respectively, their outer ends being in engagement with the circular plates 48′ and 49′. Through these circular plates, and through enlarged openings 66 and 67 in the standard 7′, pass the bolts 74 and 75, the heads 72 and 73 being in engagement with the outer face of the plate 49′. The left hand ends of the rods 74 and 75 pass through the arms 90 and 91, respectively, of a small rocking lever 93 which is pivoted at 89 to the extreme lower end of the arm 15′. The screw-threaded portions 81 and 82 of the rods are provided with the adjusting nuts 76, 77 to adjust the tension of the spring 47 and also with lock nuts 78 and 79. Pivoted at 88 to the extreme lower end of the rod 16′ and extending longitudinally through the axes of the helical springs 46 and 47 and through the enlarged opening 38' in the center of the standard 7' is a rod 87 of somewhat larger diameter than that of the rod 74 or 75. The left-hand end of this rod is screw-threaded at 80 and passes through the center of the plate 48'. The screw-threaded portion is provided with an adjusting nut 70 to adjust the tension of the spring 46. A jam nut 71 is also shown for locking the nut 70 in place after proper adjustment has been made.

Fig. 2 shows the brake shoes 17' and 18' applied, the spring 46 exerting a pull on the rod 87 to the left and the spring 47 exerting a pull on the rods 74 and 75 to the right. The rods 74 and 75 are placed at a sufficient distance from each other to properly retain the springs 46 and 47 in place, that is, prevent any lateral movement of the same. It will also be seen that when the magnet 86 is energized to rock the brake levers 19' and 20' so as to release the brake shoes 17' and 18', the rods passing through the springs will be lifted to a slight degree for the reason that the pivotal points 89 and 88 will move in the arc of a circle. The opening 38' in the standard 7' is therefore of larger diameter than the rod 87 to prevent binding, and the openings 66 and 67 are of larger diameter than the rods 74 and 75, respectively, for the same reason. In order to allow free movement of the rods 74 and 75 through the plate 48' the openings 68 and 69 are made of larger diameter than the rods and to allow free movement of the rod 87 through the plate 49' the opening 92 in its center is of larger diameter than that of rod 87. Furthermore, in order to maintain the rods 74 and 75 parallel and thus prevent binding, said rods have a pivotal connection with the arm 15' through the lever 93 which is kept substantially vertical at all times. It will now be evident that if one of the brake levers or any of its connections should be broken so as to render the brake-applying means ineffective, the other brake-applying means would still be operative. For instance if the rod 87 should be broken or become disconnected at 88 the spring 47 would still be able to apply the brake shoe 17' and thus stop the motor. Even if both the rods 74 and 75 should break and the spring 47 should be moved from its normal position, the brake shoe 18' would be applied to stop the motor. In Fig. 1 if the rod 39 should be removed, the springs 46 and 47 therein shown would still be retained in place and both brakes remain operative. As in Fig. 1 so also in Fig. 2, if either of the brake-releasing means becomes inoperative one of the brakes would always be set and the mechanism would have to be repaired before the motor could be started, unless, of course, some outside means is employed to hold the brake released against the action of its spring, in which case the other brake could be operated successfully.

Without limiting myself to the precise details of construction or arrangement of parts herein disclosed, what I claim and desire to have protected by Letters Patent of the United States is:

1. The combination with a movable member, of a plurality of brakes therefor, independent brake-applying devices for said brakes, and means for releasing one of said brakes dependent for its operativeness upon an operative condition of the applying device for the other brake.

2. The combination with a single member, of a plurality of brakes therefor, independent devices for applying the brakes, and a single means for releasing the brakes dependent for its operativeness upon an operative condition of the brake-applying devices.

3. The combination with a rotatable member, of brake mechanism, devices for independently applying separate portions of the brake mechanism, and means dependent upon an operative condition of said devices for releasing said portions of the brake mechanism.

4. In brake mechanism, the combination with a plurality of brakes, of independent resilient devices for applying the brakes, and magnetic releasing means for one of the brakes coöperating with and controlled by the applying device for another of the brakes.

5. The combination with a rotatable member, of a plurality of brakes, separate brake-applying springs, independent connections between the springs and brakes, and means for releasing one brake controlled by the applying spring for the other brake.

6. The combination with a brake pulley, of brakes, separate springs and connections for independently applying the brakes, and an electromagnet comprising members connected respectively to the brakes and movable into engagement with each other to release the brakes.

7. The combination with a plurality of brake levers, of brake shoes carried thereby, means for actuating the levers independently of each other to apply the brakes, means for releasing the brakes, and stops carried by the levers and movable into engagement with each other when the brakes are released.

8. The combination with a brake pulley, of brake levers, brake shoes carried thereby, separate springs and connections for independently applying the brake shoes, and means for preventing the release of one of the brake shoes when the other shoe has been moved away from the brake pulley beyond a predetermined limit.

9. The combination with a brake pulley, of two brake levers, two brake shoes, separate means for independently operating the levers to apply the brake shoes, and an electromagnet having two members connected to the levers and movable into contact with each other when the brake shoes are released.

10. The combination with a brake pulley, of two brake levers, brake shoes carried thereby, two brake springs and connections for independently applying the brakes, and an electromagnet having two cores connected to the levers and each forming a limit stop for the other core.

11. The combination with a brake pulley, of two brake levers, brake shoes, independently operative brake-applying springs, a stationary electro-magnet coil located between the brake levers, two magnet cores connected to the brake levers and having their inner ends extending within the coil and into proximity to each other.

12. The combination with a brake pulley, of two brake levers, two brake shoes, two springs separately mounted, connections between said springs and levers, an electromagnet having two cores, and connections between said cores and levers.

13. The combination with a brake pulley, of a double brake, of separate and independent springs for applying said brake to said pulley, and an electro-magnet having two cores and connections for releasing said brake.

14. The combination with a brake pulley, of brake levers on opposite sides of said pulley, brake shoes carried by said levers and resting on said pulley, brake-applying springs separately mounted below said pulley, connections between said springs and levers, a brake-releasing electro-magnet comprising two cores, and connections between said cores and said brake-levers.

15. The combination with a brake pulley, of a single electro-magnet, supporting means for said electro-magnet, brake levers, brackets secured to the magnet frame for supporting said brake levers, brake shoes carried by said levers, connections between said levers and said electro-magnet, separate brake-applying springs, and connections between said springs and levers.

16. The combination with a brake pulley, of brake levers, means for pivotally supporting said brake levers, brake shoes carried by said levers, separate and independent springs, connections between said springs and the lower ends of said levers, a single electromagnet, and connections between said electromagnet and the other ends of said levers.

17. The combination with a brake pulley, of two pivoted levers, a brake shoe carried by each of said levers, separate and independent brake-applying springs beneath said pulley, separate connections between said springs and the lower ends of said levers, an electro-magnet having two cores and mounted above said pulley, and connections between said cores and the upper ends of said levers.

In testimony whereof, I have signed my name to this specification in the presence of two subscribing witnesses.

JOHN D. IHLDER.

Witnesses:
W. H. STOKES,
CHARLES M. NISSEN.